United States Patent US 11,969,943 B1
Chen et al. Date of Patent: Apr. 30, 2024

(54) HOT BED DEFORMATION TOLERANCE STRUCTURE FOR LARGE-SIZED CONTINUOUS FIBER HIGH-TEMPERATURE 3D PRINTER

(71) Applicant: NANJING UNIVERSITY OF AERONAUTICS AND ASTRONAUTICS, Nanjing (CN)

(72) Inventors: Yiwei Chen, Nanjing (CN); Jinghua Zheng, Nanjing (CN); Zhongde Shan, Nanjing (CN); Wenzhe Song, Nanjing (CN); Congze Fan, Nanjing (CN); Hao Zhang, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/536,236

(22) Filed: Dec. 12, 2023

Related U.S. Application Data

(63) Continuation of application No. PCT/CN2023/077083, filed on Feb. 20, 2023.

(30) Foreign Application Priority Data

Jan. 5, 2023 (CN) .......................... 202310011189.3

(51) Int. Cl.
    *B29C 64/295* (2017.01)
    *B29C 64/232* (2017.01)
    (Continued)

(52) U.S. Cl.
    CPC .......... *B29C 64/295* (2017.08); *B29C 64/232* (2017.08); *B29C 64/245* (2017.08);
    (Continued)

(58) Field of Classification Search
    CPC .................................................... B29C 64/232
    See application file for complete search history.

(56) References Cited

U.S. PATENT DOCUMENTS

| 6,722,872 B1 * | 4/2004 | Swanson | B29C 64/112 |
| | | | 425/375 |
| 7,297,304 B2 * | 11/2007 | Swanson | B33Y 50/00 |
| | | | 264/401 |

(Continued)

FOREIGN PATENT DOCUMENTS

| CN | 204532553 U | 8/2015 |
| CN | 108859106 A | 11/2018 |

(Continued)

*Primary Examiner* — Timothy Kennedy
(74) *Attorney, Agent, or Firm* — Bayramoglu Law Offices LLC

(57) ABSTRACT

A hot bed deformation tolerance structure for a large-sized continuous fiber high-temperature 3D printer is provided. Size changes caused by thermal expansion of a hot bed are compensated through motion coordination of a secured hot bed support assembly and a motion device, especially for an aluminum alloy material. A Z-direction motion structure of this structure is fixedly mounted with a frame and works at room temperature. A compensation motion module is fixedly mounted with a Z axis and incompletely secured with the hot bed support assembly, and works at room temperature with the Z axis. The hot bed support assembly is incompletely secured and partially in a high-temperature chamber, with a maximum working temperature of 300° C. The hot bed support assembly retains motion redundancy in a direction of thermal expansion deformation, tolerates thermal deformation through a linear motion module, and compensates for metal deformation through horizontal motion coordination.

5 Claims, 5 Drawing Sheets

(51) Int. Cl.
*B29C 64/245* (2017.01)
*B33Y 30/00* (2015.01)
*B33Y 70/10* (2020.01)

(52) U.S. Cl.
CPC .............. *B33Y 30/00* (2014.12); *B33Y 70/10* (2020.01); *B29K 2905/02* (2013.01)

(56) References Cited

U.S. PATENT DOCUMENTS

| | | | | |
|---|---|---|---|---|
| 8,153,183 | B2* | 4/2012 | Skubic | B33Y 30/00 700/110 |
| 9,821,518 | B2* | 11/2017 | Bloom | B29C 64/106 |
| 10,384,440 | B2* | 8/2019 | Chang | B33Y 30/00 |
| 10,391,756 | B2* | 8/2019 | Choi | B29C 64/209 |
| 10,780,628 | B2* | 9/2020 | Padgett | B29C 64/232 |
| 10,899,069 | B2* | 1/2021 | Lorusso | B29C 64/112 |
| 11,485,079 | B2* | 11/2022 | Durand | B22F 12/222 |
| 2004/0104515 | A1* | 6/2004 | Swanson | B29C 64/40 264/497 |
| 2010/0100222 | A1* | 4/2010 | Skubic | B29C 64/245 700/110 |
| 2014/0306379 | A1* | 10/2014 | Hartmann | B29C 64/118 425/130 |
| 2016/0031158 | A1* | 2/2016 | Ogawa | B29C 64/232 425/375 |
| 2016/0052207 | A1* | 2/2016 | Bloom | B29C 64/106 425/3 |
| 2016/0144564 | A1* | 5/2016 | Padgett | B29C 64/209 425/113 |
| 2017/0057171 | A1* | 3/2017 | Chang | B29C 64/236 |
| 2017/0173890 | A1* | 6/2017 | Choi | B29C 64/112 |
| 2017/0210080 | A1* | 7/2017 | Ding | F16C 29/12 |
| 2018/0117843 | A1* | 5/2018 | Lorusso | B29C 64/106 |
| 2018/0162067 | A1* | 6/2018 | Chang | B33Y 10/00 |
| 2019/0375156 | A1* | 12/2019 | Knox | B29C 64/25 |
| 2021/0206069 | A1* | 7/2021 | Groenenboom | B66F 7/025 |
| 2021/0299956 | A1* | 9/2021 | Overby | B33Y 10/00 |
| 2022/0193996 | A1* | 6/2022 | Durand | B29C 64/393 |

FOREIGN PATENT DOCUMENTS

| | | | | |
|---|---|---|---|---|
| CN | 110421844 | A * | 11/2019 | |
| CN | 110435140 | A * | 11/2019 | ......... B29C 64/147 |
| CN | 112223741 | A | 1/2021 | |
| CN | 217098927 | U | 8/2022 | |
| EP | 2617554 | A1 * | 7/2013 | ......... B29C 67/0055 |
| KR | 20220036205 | A | 3/2022 | |

* cited by examiner

HOT BED DEFORMATION TOLERANCE STRUCTURE FOR LARGE-SIZED CONTINUOUS FIBER HIGH-TEMPERATURE 3D PRINTER

CROSS REFERENCE TO THE RELATED APPLICATIONS

This application is a continuation application of International Application No. PCT/CN2023/077083, filed on Feb. 20, 2023, which is based upon and claims priority to Chinese Patent Application No. 202310011189.3, filed on Jan. 5, 2023, the entire contents of which are incorporated herein by reference.

TECHNICAL FIELD

The present invention relates to the field of additive manufacturing technologies, and specifically to a hot bed deformation tolerance structure for a large-sized continuous fiber high-temperature 3D printer.

BACKGROUND

A 3D printing technology for continuous fiber reinforced thermoplastic composites introduces continuous fibers as a reinforcing phase, which can significantly improve mechanical properties of printed parts. However, because the 3D printing technology implements forming by stacking multiple layers of materials, warping and layering often occur during printing. The introduction of continuous fibers improves the mechanical properties of parts in the fiber direction, but weakens interlayer properties to some extent, exacerbates the anisotropy of the mechanical properties of 3D printed parts, and limits the application of the 3D printing technology for continuous fiber reinforced thermoplastic composites in key fields such as aerospace and national defense.

At present, chamber preheating is usually used to reduce a temperature difference between a printing environment and an extruded material when polyether-ether-ketone, polyether-ketone-ketone, polyphenylene sulfide, and other high-performance semi-crystalline polymers are printed. However, when a motion mechanism of a 3D printing device works in a high-temperature environment, motion modules have thermal deformation and assembly deformation. Especially for a large-sized continuous fiber high-temperature 3D printer, a high-temperature hot bed supported by a Z axis has horizontal deformation in X and Y directions during moving, resulting in deformation and jamming of a printer actuation module.

SUMMARY

To solve the above problems, the present invention discloses a hot bed deformation tolerance structure for a large-sized continuous fiber high-temperature 3D printer, which compensates for size changes caused by thermal expansion of a hot bed through motion coordination of a secured hot bed support assembly and a motion device, especially for an aluminum alloy material having a large size and a high thermal expansion coefficient.

Further, a Z-direction motion structure of this structure is fixedly mounted with a frame and works at room temperature.

Further, a compensation motion module is fixedly mounted with a Z axis and incompletely secured with the hot bed support assembly, and works at room temperature with the Z axis.

Further, the hot bed support assembly is incompletely secured and partially in a high-temperature chamber, with a maximum working temperature of 300° C. The hot bed support assembly retains motion redundancy in a direction of thermal expansion deformation, tolerates thermal deformation through a linear motion module, and compensates for metal deformation through horizontal motion coordination.

Further, the hot bed support assembly retains motion redundancy as follows: one corner of the hot bed is secured, the thermal deformation in an X-axis direction is compensated through the linear motion module, and after the high-temperature chamber is heated, the thermal deformation in the X-axis direction can drive the linear motion module to move, so as to prevent Z-axis deformation and jamming.

Further, the thermal deformation in a Y-axis direction is compensated through a linear motion module, following the same principle as the X-axis compensation method.

Further, the thermal deformation compensation method is mechanical passive compensation, which can adapt to thermal deformation at different temperatures without monitoring or structural modification for different temperatures. Meanwhile, the structure is also suitable for contraction compensation in low-temperature environments.

The hot bed deformation tolerance structure for the large-sized continuous fiber high-temperature 3D printer is different from the conventional rigid securing method for a hot bed.

The structure of the present invention adopts incomplete securing to implement motion compensation for thermal deformation and assembly deformation.

As mentioned above, when a motion mechanism of a 3D printing device works in a high-temperature environment, motion modules have thermal deformation. Especially for a large-sized continuous fiber high-temperature 3D printer, a high-temperature hot bed supported by a Z axis has horizontal deformation in X and Y directions during moving, resulting in deformation and jamming of a printer actuation module.

A hot bed deformation tolerance structure for a large-sized continuous fiber high-temperature 3D printer is designed to compensate for size changes caused by thermal expansion of a hot bed through motion coordination of a secured hot bed support assembly and a motion device, especially for an aluminum alloy material having a large size and a high thermal expansion coefficient.

Meanwhile, the compensation method of the present invention is mechanical passive compensation, which can adapt to thermal deformation at different temperatures without monitoring or structural modification for different temperatures. In addition, the structure is also suitable for contraction compensation in low-temperature environments and non-parallel problems of motion modules caused by assembly.

This patent compensates for the thermal expansion and contraction of an internal high-temperature chamber through the assembly motion coordination of an external motion mechanism.

DETAILED DESCRIPTION OF THE EMBODIMENTS

The present invention will be further illustrated below in conjunction with the drawings and specific embodiments. It should be understood that the following specific embodiments are only used to illustrate the present invention and not to limit the scope of the present invention. It should be noted that the terms "front", "back", "left", "right", "upper", and "lower" used in the following description refer to the directions in the accompanying drawings, and the terms "inside" and "outside" refer to the directions towards or away from the geometric center of a specific component respectively.

Figure 1:
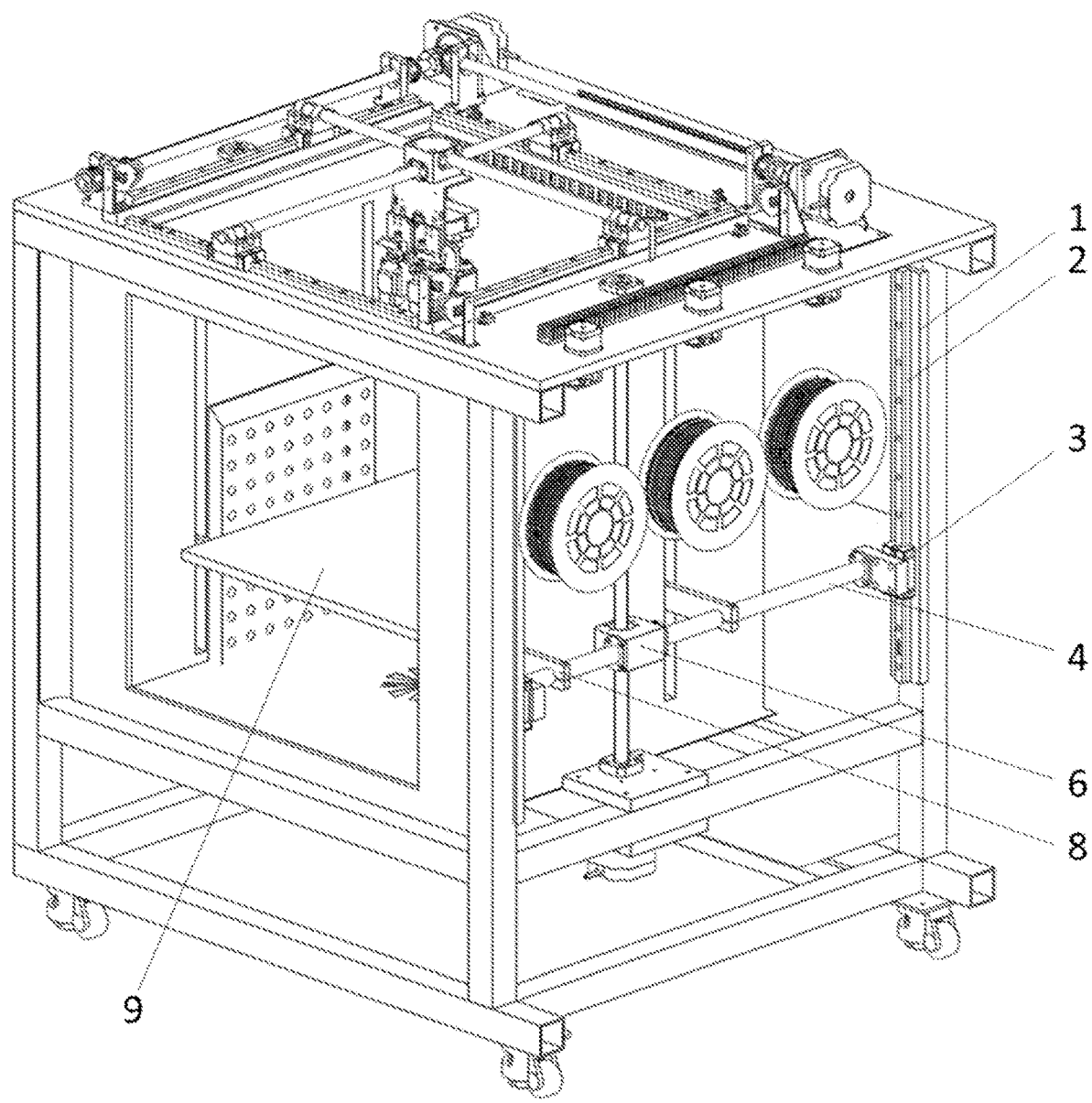
FIG. 1 is an overall structural design diagram of a large-sized continuous fiber high-temperature 3D printer.
Figure 2:
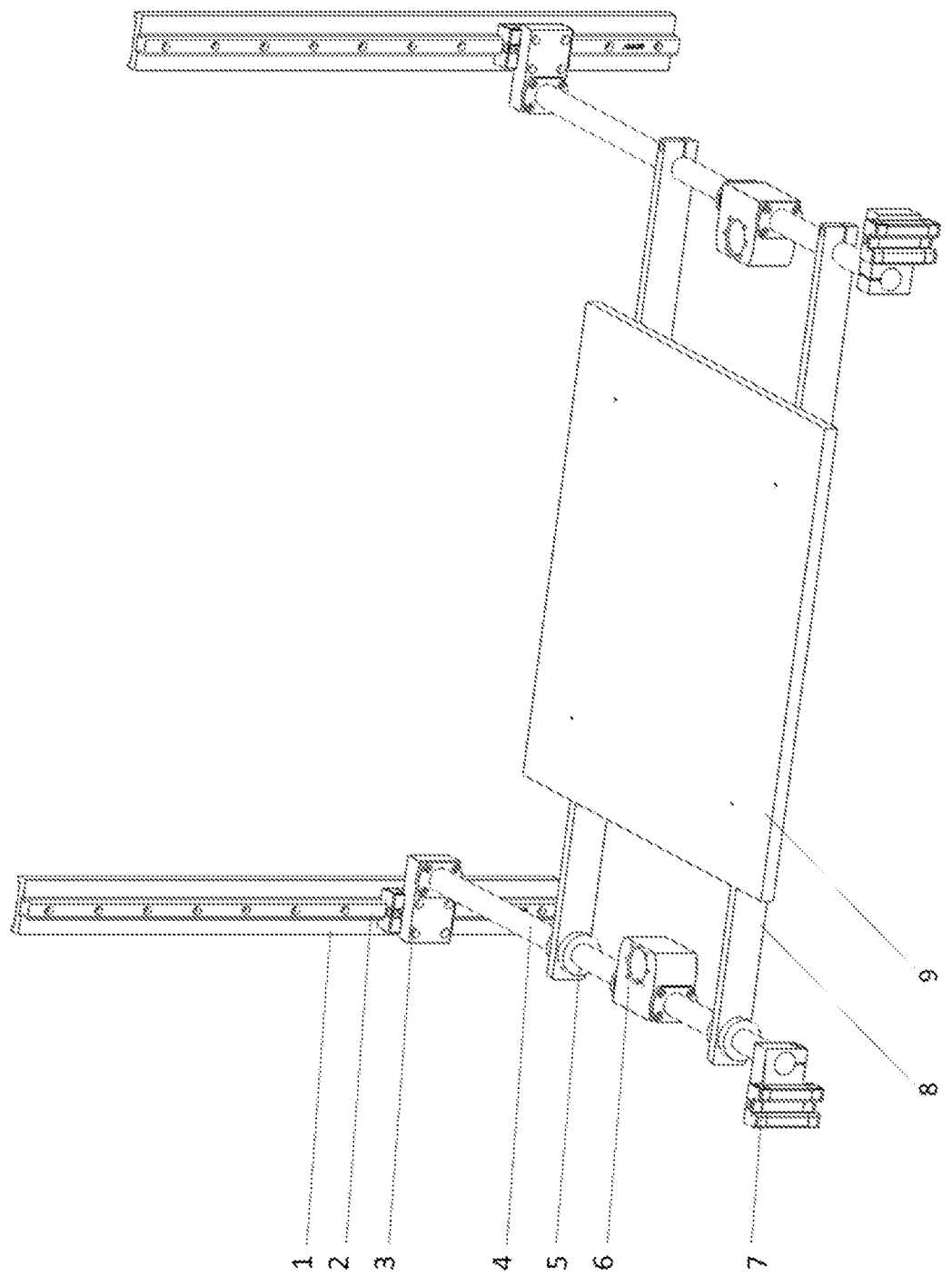
FIG. 2 is a design diagram of a hot bed deformation tolerance structure for a large-sized continuous fiber high-temperature 3D printer.

FIG. 1 is an overall structural design diagram of a large-sized continuous fiber high-temperature 3D printer. FIG. 2 is a design diagram of a hot bed deformation tolerance structure for a large-sized continuous fiber high-temperature 3D printer, including a linear guide rail mounting plate 1, a linear guide rail 2, a compensation motion module 3, a polished shaft 4, a polished shaft limit ring 5, a Z-axis lifting motion module 6, a limit motion module 7, a hot bed support assembly 8, and a hot bed 9.

In this embodiment, the linear guide rail mounting plate 1, the linear guide rail 2, the compensation motion module 3, the polished shaft 4, the polished shaft limit ring 5, the Z-axis lifting motion module 6, and the limit motion module 7 work at room temperature; the hot bed support assembly 8 is partially in a 300° C. high temperature environment; and the hot bed 9 is in a 300° C. high temperature environment. The hot bed support assembly 8 and the hot bed 9 have thermal deformation in heating and cooling processes.

In this embodiment, the hot bed support assembly 8 and the hot bed 9 are made of aluminum alloy, and the hot bed has a size of 800 mm×800 mm. The aluminum alloy has a known thermal conductivity of 23.6E-6/K, and the thermal deformation of the aluminum alloy hot bed 9 is about 5.664 mm by calculation. The hot bed support assembly 8 has a size of 1000 mm in a high-temperature chamber and a thermal deformation of about 7.08 mm.

As shown in FIG. 2, the connection between the limit motion module 7 and the polished shaft 4 is fixed; and the connection between the compensation motion module 3 and the polished shaft 4 is not fixed. The polished shaft 4 is inserted into a linear bearing of the compensation motion module 3 and can move axially.

In this embodiment, the linear guide rail mounting plate 1 and the linear guide rail 2 are mounted on a printer frame to guide Z-direction motion of the modules, so as to ensure vertical motion precision.

Figure 3:
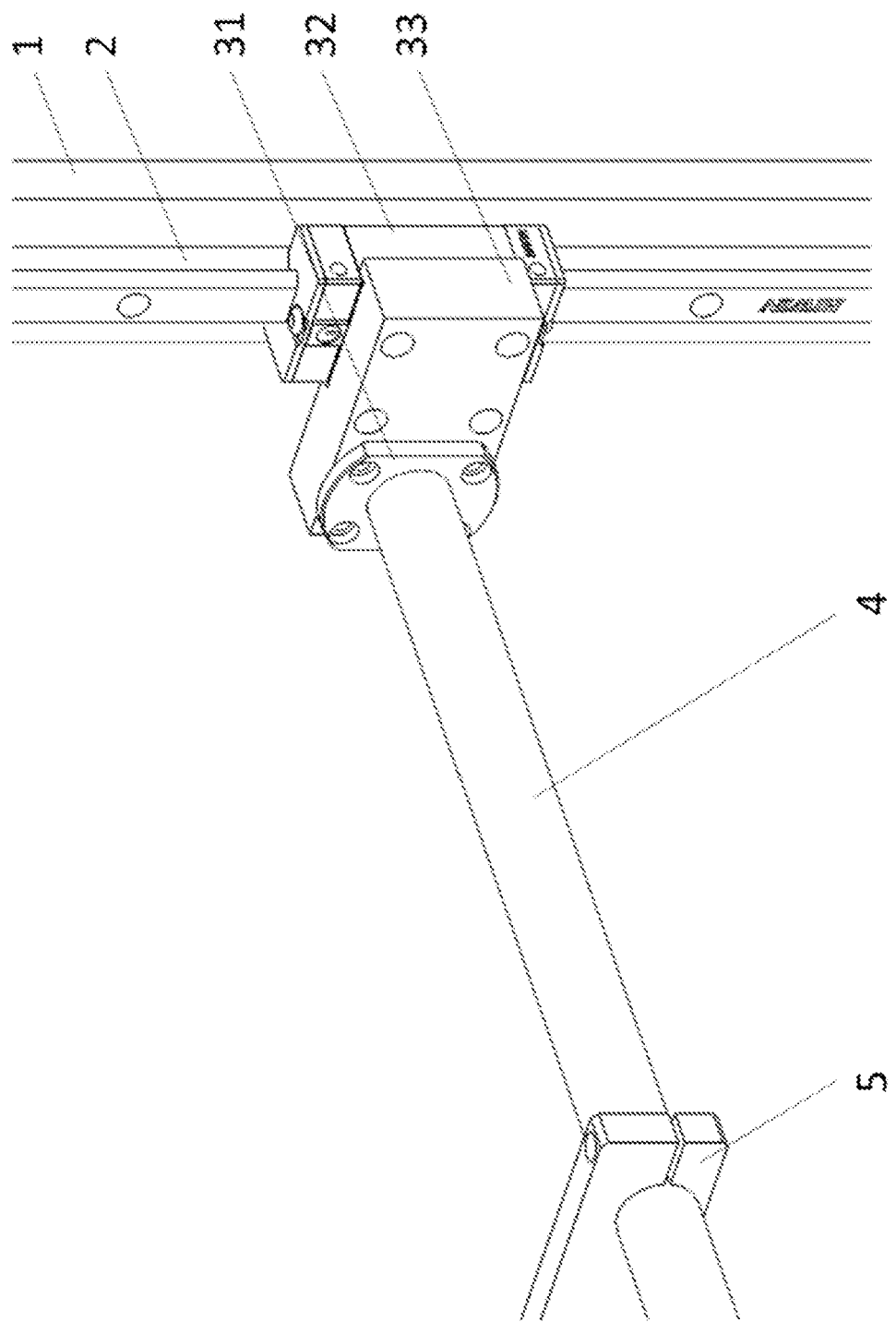
FIG. 3 is a schematic structural diagram of a compensation motion module.

In this embodiment, the compensation motion module 3 includes a second polished shaft flange linear bearing 31, a second linear motion slider 32, and a second connecting block 33, as shown in FIG. 3. When moving vertically in a Z direction, the polished shaft 4 can move axially within the second polished shaft flange linear bearing 31 to prevent thermal deformation, cold deformation, and deformation and jamming of the motion modules due to non-parallel mounting of the linear guide rail mounting plate 1 and the linear guide rail 2.

The second linear bearing 31 is a type of bearing that can slide linearly and can slide axially along the polished shaft 4. The axial movement of the polished shaft 4 within the second linear bearing 31 is mainly for compensating for motion errors caused by Z-axis thermal deformation, cold deformation, and non-parallel assembly.

In this embodiment, the polished shaft 4 is connected to the compensation motion module 3, the polished shaft limit ring 5, the Z-axis lifting motion module 6, and the limit motion module 7, where the compensation motion module 3 and the Z-axis lifting motion module 6 can move axially along the polished shaft; and the Z-axis lifting motion module 6 and the limit motion module 7 are fixedly connected to the polished shaft for limit.

In this embodiment, the polished shaft limit ring 5 is used for limiting the axial movement of the hot bed support assembly 8 along the polished shaft, the polished shaft 4 is in clearance fit with the hot bed support assembly 8, and the polished shaft limit ring 5 is in clearance fit with the hot bed support assembly 8. When thermal deformation, cold deformation, and assembly deformation occur, the hot bed support assembly 8 can extend or retract in a length direction to prevent deformation and jamming of the motion modules.

In this embodiment, the Z-axis lifting motion module 6 includes a first polished shaft flange linear bearing 61 and a first connecting block 62. The first connecting block 62 can be driven to move in the Z direction by mounting a T-shaped screw or a ball screw on the first connecting block 62. Meanwhile, the first connecting block 62 can move axially along the first polished shaft flange linear bearing 61 to prevent motion jamming caused by axial deformation.

Figure 4:
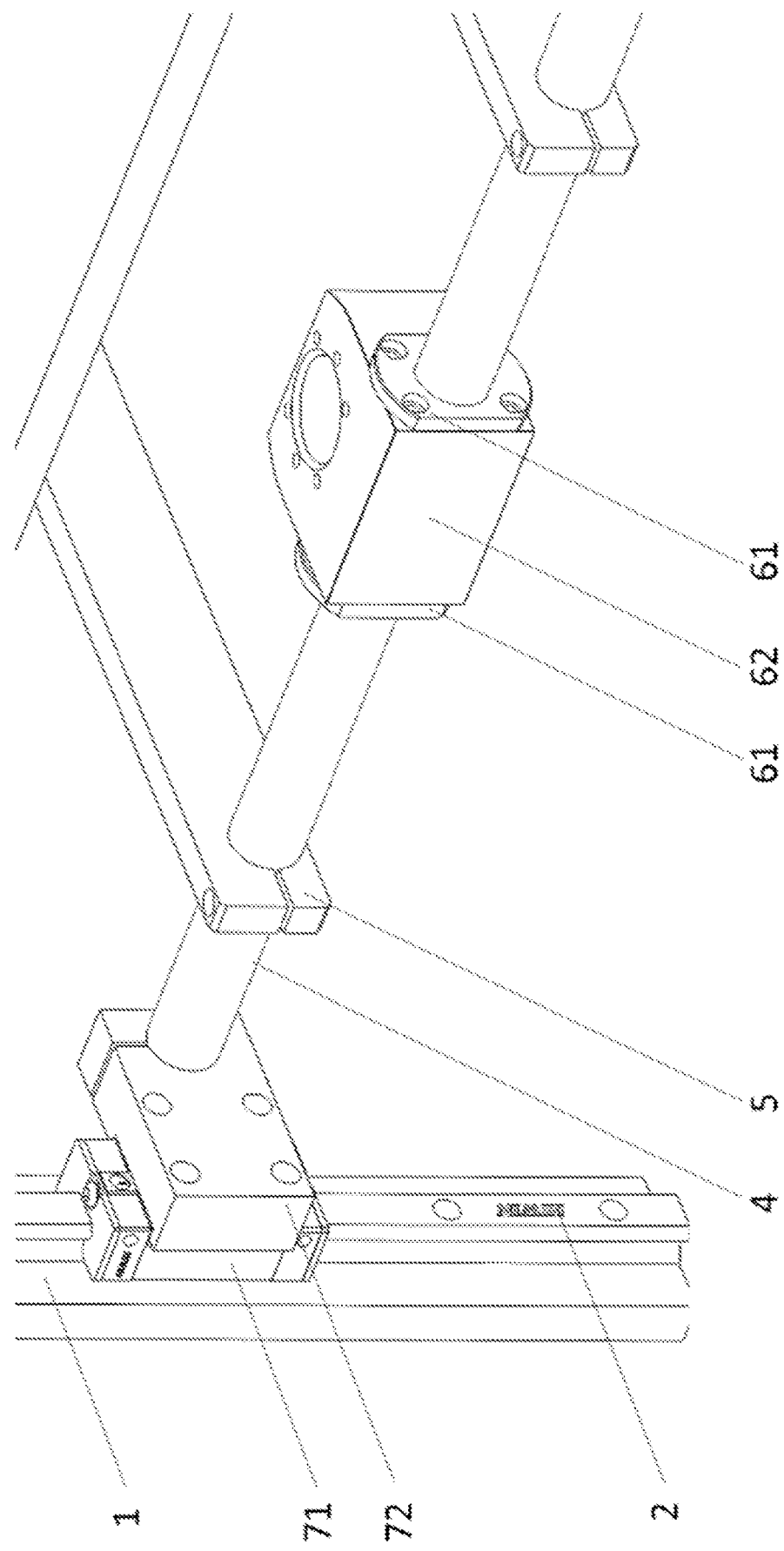
FIG. 4 is a schematic structural diagram of a limit motion module.
Figure 5:
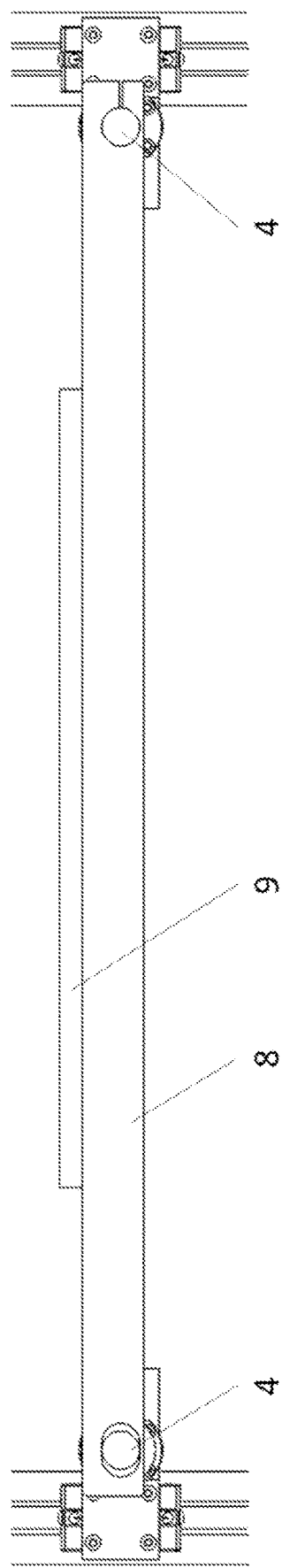
FIG. 5 is a schematic structural diagram of a hot bed support assembly.

In this embodiment, the limit motion module 7 includes a third linear motion slider 71 and a third connecting block 72, and is used for securing the polished shaft 4 and driving the polished shaft 4 to move vertically in the Z direction when moving vertically in the Z direction, as shown in FIG. 4.

In this embodiment, one end of the hot bed support assembly 8 is rigidly connected to the polished shaft for positioning, and the other end is provided with a slot hole. The polished shaft limit ring 5 limits the hot bed support assembly 8 to move axially along the polished shaft 4, and the hot bed support assembly 8 can also move in a length direction of the slot hole, thereby compensating for thermal deformation, cold deformation, and assembly deformation of the hot bed and preventing deformation and jamming of the motion modules.

In this embodiment, the hot bed 9 is rigidly secured to the hot bed support assembly 8, is a part forming platform in a 3D printing process, and can move freely in the vertical direction along the Z axis.

The technical means disclosed in the solution of the present invention are not limited to the technical means disclosed in the foregoing implementations, but also include technical solutions formed by any combination of the above technical features.

What is claimed is:

1. A bed deformation tolerance structure for a large-sized continuous fiber high-temperature 3D printer, comprising a bed, wherein the bed is arranged on a bed support assembly; a shaft is connected to each of two sides of the bed support assembly; the shaft on one side is rigidly connected to the bed support assembly, and a shaft limit ring is arranged on the shaft on the other side that is in clearance fit with the bed support assembly; a compensation motion module is connected to one end of each of the shafts, and a limit motion module is connected to the other end of the shaft; the compensation motion module is in sliding fit with a linear slide rail; a Z-axis lifting motion module is arranged on the shaft; and the shaft limit ring is in clearance fit with the bed support assembly.

2. The bed deformation tolerance structure for the large-sized continuous fiber high-temperature 3D printer according to claim 1, wherein the Z-axis lifting motion module comprises a first shaft flange linear bearing and a first connecting block, and the first connecting block is configured to be driven to move in a Z direction by mounting a T-shaped screw or a ball screw on the first connecting block; and the first connecting block is also configured to move axially along the first shaft flange linear bearing to prevent motion jamming caused by axial deformation.

3. The bed deformation tolerance structure for the large-sized continuous fiber high-temperature 3D printer according to claim 1, wherein the compensation motion module comprises a second shaft flange linear bearing, a second linear motion slider, and a second connecting block; and when moving vertically in a Z direction, the shaft is configured to move axially within the second shaft flange linear bearing to prevent deformation.

4. The bed deformation tolerance structure for the large-sized continuous fiber high-temperature 3D printer according to claim 1, wherein the limit motion module comprises a third linear motion slider and a third connecting block, and the limit motion module is used for securing the shaft and driving the shaft to move vertically in a Z direction when moving vertically in the Z direction; and the third linear motion slider is in sliding fit with the linear slide rail.

5. The bed deformation tolerance structure for the large-sized continuous fiber high-temperature 3D printer according to claim 1, wherein the bed support assembly and the bed are made of aluminum alloy.

\* \* \* \* \*